July 29, 1941.    A. N. IKNAYAN ET AL    2,251,135
METHOD AND APPARATUS FOR FORMING WASHERS AND THE LIKE
Filed May 4, 1940    3 Sheets-Sheet 1
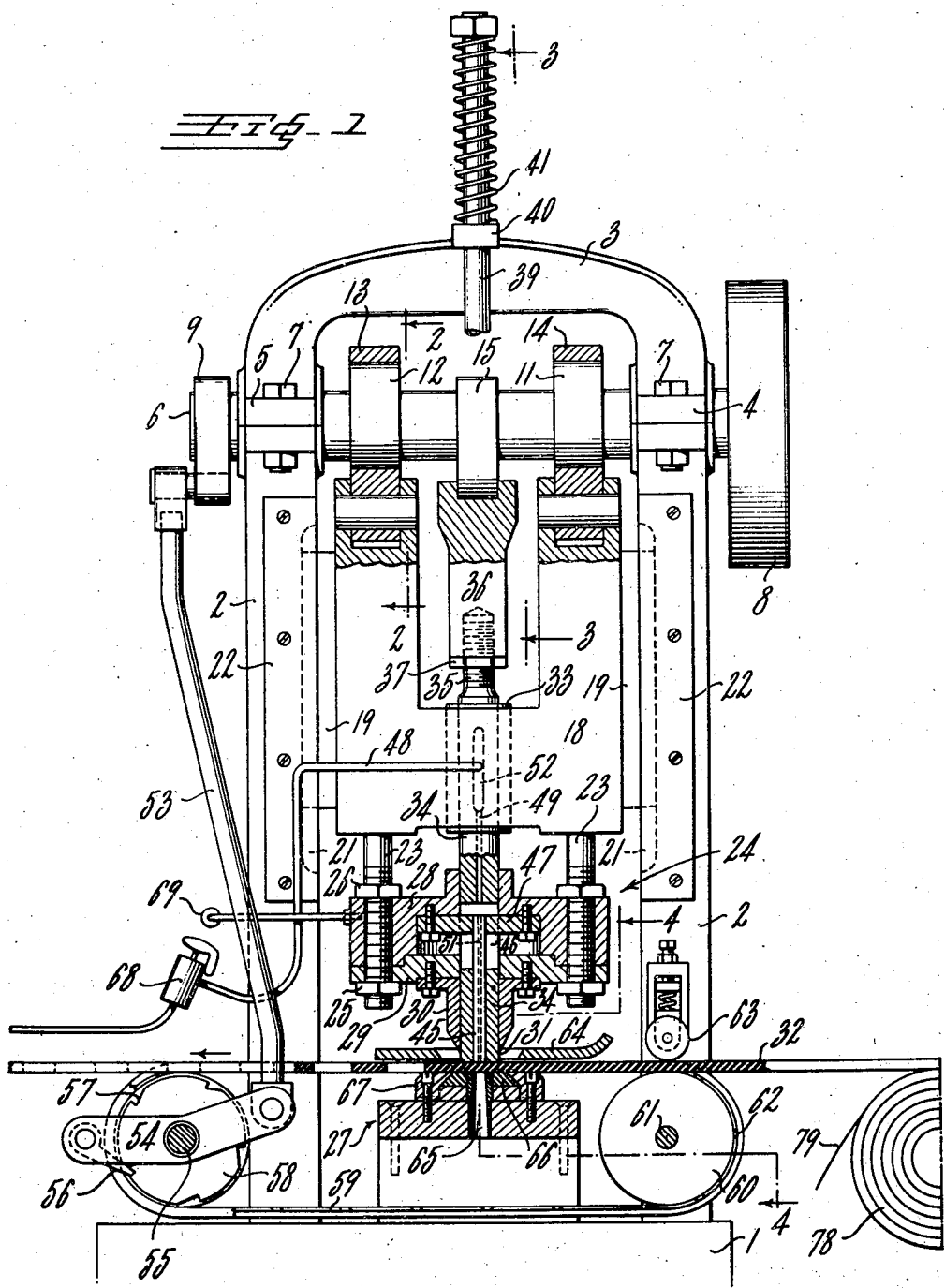
INVENTORS
ALFRED N. IKNAYAN
RALPH G. NULL
BY
ATTORNEY

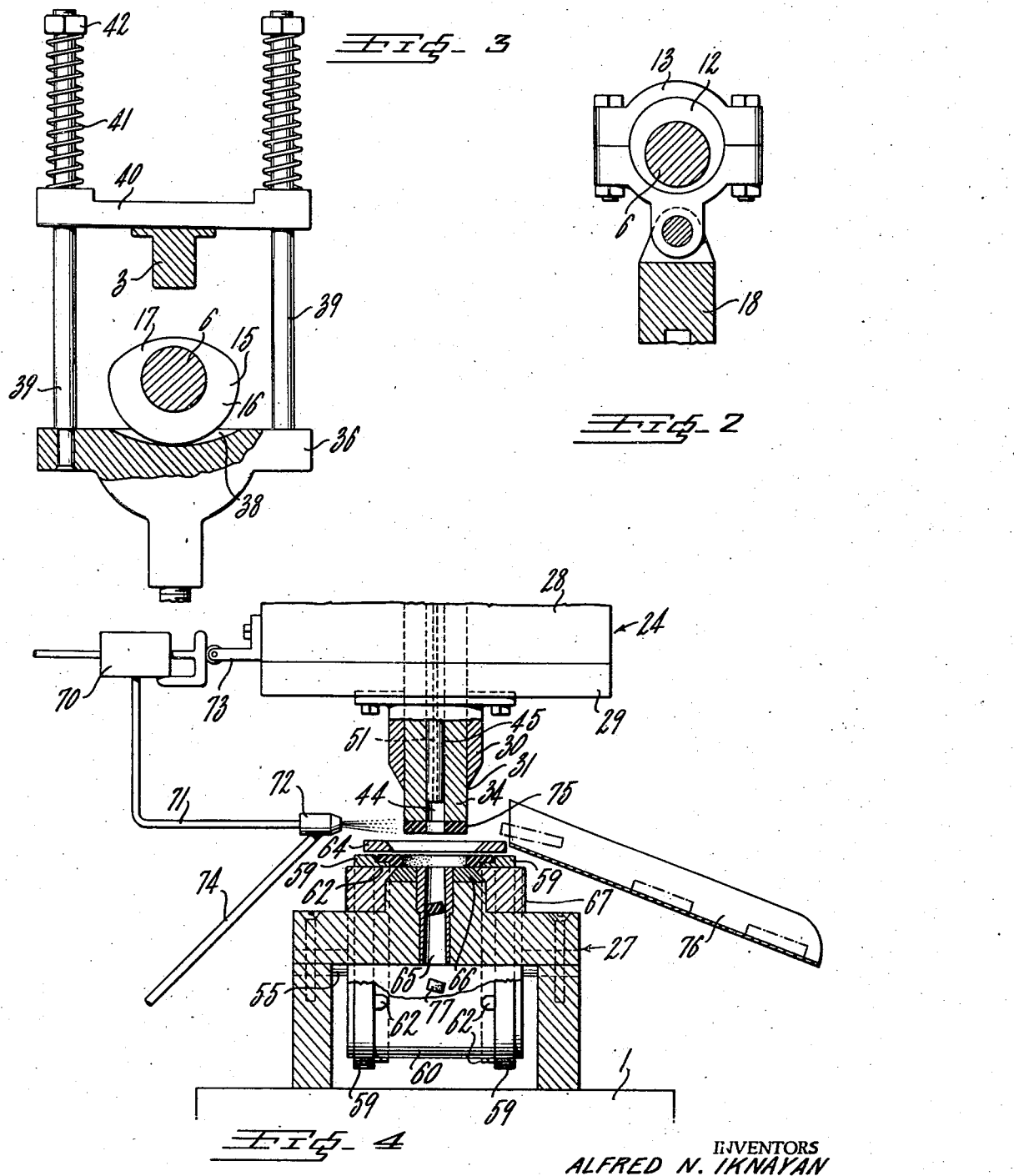

July 29, 1941.  A. N. IKNAYAN ET AL  2,251,135

METHOD AND APPARATUS FOR FORMING WASHERS AND THE LIKE

Filed May 4, 1940  3 Sheets-Sheet 3

INVENTORS
ALFRED N. IKNAYAN
RALPH G. NULL
BY
ATTORNEY

Patented July 29, 1941

2,251,135

UNITED STATES PATENT OFFICE 2,251,135

METHOD AND APPARATUS FOR FORMING WASHERS AND THE LIKE

Alfred N. Iknayan and Ralph G. Null, Indianapolis, Ind., assignors to United States Rubber Company, New York, N. Y., a corporation of New Jersey Application May 4, 1940, Serial No. 333,304

13 Claims. (Cl. 164—22)

This invention relates to a method and apparatus for forming washers, and the like, and more particularly to punching machines employing complementary punch and die members for successively producing like washers or like pieces of plastic material of uniform size or volume.

Heretofore, in the production of successive pieces of plastic material by punching or shearing operations from elongated strips or sheets of plastic stock such as unvulcanized rubber composition or the like, much difficulty has been experienced in obtaining the uniform results desired since physical properties, such as softness, thickness, tackiness and the like, of the plastic stock entering the punching machines often varied and when such occurred materially affected the uniformity of volume of the pieces being produced thereby.

When pieces of rubber composition or the like of slightly varying sizes, as obtained from conventional punching machines, were placed within the complementary sections of vulcanizing molds, even slight variations in the volume of these pieces materially affected the quality and often the economy of the finished articles subsequently derived therefrom. For example, in cases where these pieces of plastic material were too small in volume they usually failed to fill the mold cavities properly and thus rendered the finished articles defective. Also, in cases where the pieces were too large, the excess material thereof was often forced outwardly between the mold sections and thus interfered with the proper closing of these sections. The finished articles in such cases were also often rendered defective as well as unnecessarily expensive as a result of using excess material. Only those pieces of plastic material which were of a correct size or volume produced finished articles of the satisfactory quality and economy desired.

The method and apparatus of this invention and particularly the punching machine and punch and die combinations therefor have substantially eliminated these objections and difficulties experienced in punching machines of former construction by providing punch and die combinations which punch or shear successive similar pieces of plastic material of exact or substantially exact predetermined volume from a strip or sheet of plastic stock. The construction and arrangement of the structure is such that the correct volume is automatically given to each successive piece of material produced thereby even though the thickness, toughness or other physical properties thereof may vary appreciably from time to time in the stock being fed into the machine. This exactness of volume in each piece produced makes it possible to obtain better and more uniform results in the finished articles subsequently formed therefrom than have heretofore been obtainable from plastic pieces produced by punching machines of former construction.

The apparatus or structure of this invention also comprises convenient and efficient means by which various parts of the machine may be easily and readily adjusted or interchanged so that pieces of plastic material of various predetermined volumes may be produced thereby. This punching machine is also constructed and arranged so as to rapidly and accurately punch or shear these pieces of plastic material of exact volume automatically and then discharge them, as well as the resulting waste material, from the machine without interruptions or variations in its speed or cycle of operation.

Further details of the invention will be more fully understood when taken in conjunction with the accompanying drawings, in which:

Fig. 1 represents a front elevational view, partly in section and partly broken away, of a punching machine comprising features of a preferred embodiment of the invention;

Fig. 2 is a vertical sectional view of a portion of the punching machine of Fig. 1 taken substantially upon section line 2—2 thereof;

Fig. 3 is a vertical sectional and partly broken away view of another portion of the machine of Fig. 1 taken substantially upon section line 3—3 thereof;

Fig. 4 is a vertical sectional and partly broken away view taken substantially upon section line 4—4 of Fig. 1 but showing the cutting die assembly and plunger thereof in elevated position;

Figure 5:
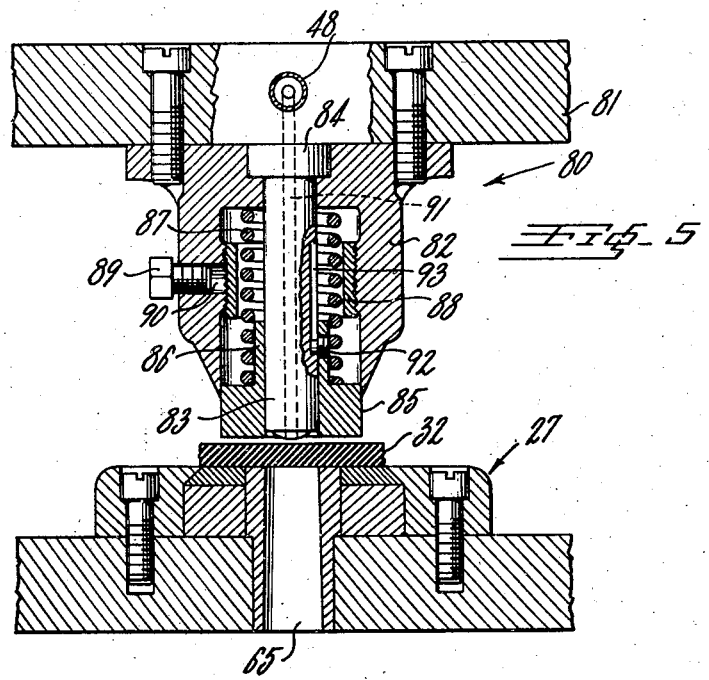
Fig. 5 is a vertical sectional view of a modified form of punch and die combination which may be employed as a part of the punching machine of Fig. 1.

Referring to the drawings and particularly to the embodiment shown by Figs. 1-4, the reference numeral 1 designates a main support upon which are mounted spaced vertical side frame members 2 connected together at their upper extremities by a removable transverse yoke 3. Bearings 4 and 5 are formed respectively in opposite ends of the yoke 3 and in the upper ends of the side frame members 2 for the reception of a crank shaft 6 which serves as the main driving element for the punching machine. Bolts 7 are employed for removably retaining the yoke 3 in position upon the side frames 2. Thus the support 1, members 2 and yoke 3 are combined to produce a very rigid and sturdy load carrying main frame structure for the moving parts of the machine.

The crank shaft 6 is positioned in the side frames 2 with one of its free ends extending laterally beyond the bearing 4 so that a driving pulley 8 secured thereon may be connected to a convenient external source of power. Upon an opposite free end of the crank shaft 6 is keyed a crank 9 for actuating the stock advancing means which will be more fully hereinafter described. Mounted upon the crank shaft 6 intermediately of but adjacent the bearings 4 and 5, respectively, are similar eccentric bearings 11 and 12 (Figs. 1 and 2) for actuating driving collars 13 and 14 positioned thereon. Also positioned upon the shaft 6 and secured thereto between the bearings 11 and 12 is a cam 15 comprising concentric and eccentric peripheral portions or surfaces 16 and 17 (Fig. 3). The crank 9 and the cam 15 are circumferentially positioned upon the shaft 6 relative to each other and also relative to the eccentric bearings 11 and 12 so that a proper predetermined timing may be given to the various moving parts of the punching machine in a manner to be more fully hereinafter described.

A vertically movable U-shaped cross head 18 is positioned between the side frames 2 and provided with guide runners 19 slidably fitting within guideways 21 formed in the sides of said frame members 2. Guide plates 22 are removably secured upon the forward faces of the side frames 2 and serve to retain and guide the runners 19 during vertical movement thereof. The upper free ends of the U-shaped crosshead 18 are pivotally secured respectively to collars 13 and 14 so as to be moved thereby as the crank shaft 6 rotates and causes these collars to move up and down.

A plurality of spaced bolts 23 are rigidly secured in and extend below the lower portion of the U-shaped cross head 18 and are provided with threaded free end portions for removably and adjustably receiving a cutting die assembly. In this preferred embodiment of the invention the cutting die assembly employed upon the bolts 23 is generally indicated by the numeral 24 and may be secured in a proper predetermined position thereon by adjusting nuts 25 and 26. In this way parts of the die assembly 24 may be easily and accurately positioned vertically relative to a work support 27 for purposes to be hereinafter more completely described. The cutting die assembly 24 comprises upper and lower complementary bridge plates 28 and 29, respectively. The plate 29 is arranged to carry a cylindrical cutting die 30 provided with a lower circular cutting edge 31 for engaging plastic stock 32 resting upon the work support 27 in such a manner as to punch, pinch or shear therefrom a piece of plastic material of exact predetermined size or volume.

A cylindrical bushing 33 is centrally secured in the bight portion of the U-shaped cross head 18 and is arranged to slidably receive and guide a vertically disposed plunger 34 which has its upper end threaded, as indicated at 35, for adjustable engagement with a cam shoe 36. A locking nut 37 is shown upon the threaded portion 35 and serves to retain the plunger in proper adjusted position relative to the cam shoe 36. In the upper surface of the cam shoe 36 is formed a slot 38 (Fig. 3) for receiving and slidably engaging the peripheral portions 16 and 17 of the cam 15 mounted on the shaft 6. A pair of tensioning bolts 39 are secured to the cam shoe 36 at opposite sides of the shaft 6 and extend upwardly through holes in a cross bar 40 resting upon the upper surface of the yoke 3. Positioned about the upper portions of the bolts 39 are springs 41 which are held compressed against the bar 40 by nuts 42 threaded onto the ends of bolts 39 so that the cam shoe 36 will at all times be maintained in engagement with the cam 15 during operation of the machine.

The plunger 34 has its lower portion positioned within and in sliding engagement with central vertically aligned apertures formed in the complementary bridge plates 28 and 29 and in the cutting die 30 so that the lower horizontal circular face of the plunger forms a foot or abutment for engaging portions of the strip 32 of plastic stock during certain stages of operation of the machine. In the lower end of the plunger 34 is formed a central vertical bore 44 (Fig. 4) through which extends a circular punch 45 with its upper end extending into a vertically elongated slot 46 extending transversely through the plunger. The upper end of the punch 45 is rigidly secured to a cross bar 47 extending through the slot 46. The bar 47 has its ends firmly but removably secured to the upper bridge plate 28 so that movement of the plunger 34 relative to the bridge plate 28, bar 47 and punch 45 may occur without interference.

A flexible air hose 48 is attached, in this embodiment of the invention, to a face of the U-shaped cross head 18 and is arranged to communicate with a passageway 49 centrally formed in the plunger 34 so that air under pressure may pass from the hose 48 through the passageway 49, through the slot 46 and then through a passageway 51 extending vertically through the punch 45. In order to allow proper relative movement between the cross head 18 and the plunger 34 and still allow air to pass freely therethrough, an elongated slot 52 is formed transversely through the plunger 34. A direct passage of air is thus permitted through these parts of the machine at all times regardless of their various relative positions.

The stock advancing means, previously referred to, comprises a drag link 53 pivotally and swivelly connected at its opposite ends to the crank 9 and to a lever 54 mounted on a shaft 55 carried by a fixed part of the main frame. A reciprocating action derived from the rotation of the crank 9 serves to actuate the link 53, the lever 54 and thus a spring pressed pawl 56 in a step by step manner so that the pawl 56 successively engages circumferentially spaced notches 57 formed in a roller 58 arranged to support one end of a pair of flexible endless conveyor belts 59. While flexible belts have been employed in the present disclosure, endless chains formed of pin-connected links could as readily be used, if desired, for carrying the plastic stock through the machine. The opposite end of said pair of endless conveyor belts is supported by a roller 60 mounted upon a shaft 61 also carried by a fixed part of the machine.

Each of the conveyor belts 59 is provided with a plurality of inwardly projecting fingers 62 uniformly spaced there along so as to firmly engage spaced portions of the plastic stock 32 and thereby convey it through the machine. These fingers 62 are so spaced upon the belts 59 that they do not interfere with the operation of the cutting die assembly 24 and plunger 34 as successive pieces of plastic material are severed from the strip 32. A spring pressed auxiliary roller 63 is positioned above the roller 60 and is supported by a fixed part of the frame 2 so as to press the plastic stock 32 downwardly into secure engagement with the fingers 62 of the conveyor belts 59 and thus insure proper increments of movement of the stock as the belts are actuated. If desired, small upstanding metallic points (not shown) may be employed upon each finger 62 for penetrating into the stock 32 and thus insure positive movement of the material with the belts. In such cases it would only be necessary for the roller 63 to bear lightly upon the strip 32 and thereby force the strip onto the points only and not necessarily about said fingers. A fixed apertured stripping plate 64 is arranged in spaced relation above the work support 27 and serves to prevent any substantial upward movement of the stock 32 with the cutting die 30 during operation of the machine.

Centrally positioned in the work support 27 is a tapered die 65 about the upper portion of which is located a cutting ring 66, preferably hardened metal such as tool steel, for positive engagement of the cutting edge 31 of the movable die 30. A collar 67 removably maintains this ring 66 in proper position and forms therewith a horizontal working surface across which the plastic stock may be moved by the conveyor belts 59. The work support 27 may be secured in fixed position upon the main support 1 in any desired manner so long as sufficient clearance is maintained for the lower run of the endless belts 59 operating beneath the work support.

An air valve 68, located upon the fixed part of the frame and connected to a suitable source of compressed air and to the flexible hose 48, is so positioned adjacent the lower end of the path of movement of the cross head 18 and assembly 24 that a trip arm 69 extending from the side of the assembly 24 is adapted to engage and actuate said valve at the proper time during the operating cycle of the machine. A second air valve 70, (Fig. 4) positioned upon another fixed part of the frame and connected to said source of compressed air and to an air line 71 and nozzle 72, is so positioned adjacent the upper operating position of said assembly 24 as to be actuated by a trip arm 73 carried by the assembly 24 during the operating cycle of the machine. A water line 74 communicates with the nozzle 72 so that a blast of air and atomized water may be directed against a washer or a piece 75 of plastic material severed from the stock 32. This blast of air and water serves to blow the washer from the lower face of the plunger 34 while the plunger is in an elevated position and onto an inclined discharge chute 76. A plug punched from the center of the washer 75 by the punch 45 is indicated by the numeral 77.

A purpose for mixing water with the air directed against the washer 75 and adjacent parts of the machine is to moisten or lubricate the strip of plastic stock and thereby render it more susceptible to the shearing or punching operations. The water also prevents too strong adhesion between the washer 75 and adjacent parts of the machine. While the plastic stock 32 may be supplied to the machine in straight strip form, there is shown at 78 (Fig. 1) a coil of plastic stock. In such cases a separating layer 79 of duck, or the like, may be employed to prevent adhesion between adjacent layers of the stock. This separating layer 79 is stripped from the stock before the stock enters the machine and thus may be used repeatedly as a separating layer for such purposes.

When the punching machine of the embodiment shown by Figs. 1-4 inclusive is placed in operation, rotation of the shaft 6 causes the portion 16 of the cam 15 to force the shoe 36 and plunger 34 downwardly against and if necessary even slightly into the plastic stock 32 until said plunger has reached a predetermined location a desired distance above the work support 27. The structure of the machine is such that this distance remains constant, after it has been properly adjusted, during operation of the machine regardless of variations which may occur in the thickness of the plastic stock entering the machine. While the concentric portion 16 of the cam 15 engages the shoe 36 during continued rotational movement of the shaft 6, the plunger 34 remains at said location and in engagement with the plastic stock 32 and at such time rotation of the bearings 11 and 12 causes the collars 13 and 14 to move the cross head 18 and the cutting die assembly 24 carried thereby downwardly. This downward movement of the assembly 24 first causes the punch 45 attached thereto and positioned within the plunger 34 to engage the plastic stock 32 and punch or shear a hole therein forcing the plug 77 into the die 65. Since the plastic material between the plunger 34 and the work support 27 is at all times substantially confined, no appreciable movement or distortion may occur in the material about the punch 45 as the plug 77 is pressed from the stock and forced into said die 65.

Further downward movement of the cutting die assembly, while the plunger 34 remains in engagement with the plastic stock 32, causes the cutting edge 31 to move into engagement with the plastic stock and into engagement with the hardened ring 66 and thereby cut, pinch or shear the plastic washer 75 from the stock. As this severing operation takes place any tendency of the stock to distort or "flow" inwardly is prevented by the adjacent surfaces of the plunger 34, punch 45, die 65 and work support 27 contacting the plastic stock. Any movement of the plastic stock caused by downward movement of the cutting die forces the excess material of the strip 32 outwardly therefrom and thus washers 77 of exact predetermined volume are produced.

During the punching or shearing action between the punch 45 and the die 65, the trip arm 69 engages the air valve 69 and causes it to open momentarily and emit compressed air which passes through the hose 48, passageways 49 and 51 for blowing the plug 77 from the die 65. The tapered bore of the die 65 facilitates this ejecting operation.

Continued rotational movement of the shaft 6, bearings 11 and 12 and cam 15 allows the cam shoe 36 and the plunger 34 to be drawn upwardly by the compressed springs 41, thereby retracting the lower portion of the plunger 34 from the plane of the plastic stock 32, and at the same time causes the collars 13 and 14 and the cross head 18 to simultaneously draw the cutting die assembly 24 upwardly. Sufficient adhesion exists between the plastic washer 75 and the punch 45, cutting die 30 and plunger 34 to cause the washer to be lifted upward thereby to an elevated position in alignment with the nozzle 72. When such position has been reached, the plunger 34 remains substantially stationary momentarily while the cutting die 30 and punch 45 continue to move upwardly and completely above the lower face of the plunger 34. As the assembly 24 reaches this elevated position, the arm 73 carried by the assembly 24 actuates the valve 70 and thus causes a blast of air and water to be directed against the washer 75, which blast is sufficient to quickly loosen the washer and blow it onto the inclined chute 76.

The crank 9 is so positioned upon the shaft 6 that upward movement thereof moves the pawl-carrying end of the lever 54 downwardly at a time when the cutting die 30, plunger 34 and punch 45 are retracted above the plane of the plastic stock 32. This movement causes the pawl 56 to engage one of the notches 57 in the roller 58 and rotates the roller, which in turn causes the belts 59 and the plastic stock positioned thereon to move a predetermined increment of travel. Downward movement of the crank 9 resets the pawl 56 in the next successive notch 57 so that an intermittent motion is applied to the stock advancing means between successive punching or shearing operations.

It will be seen from the foregoing description that the several parts of the punching machine and punch and die members of Figs. 1-4 inclusive, are so positioned and arranged as to successively produce a plurality of similar washers or the like of exact predetermined volume from plastic stock regardless of variations which may occur in the physical properties thereof.

Fig. 5 shows a modified form of cutting die assembly which may be employed as a part of this invention and with the elements thereof slightly elevated above the plastic stock on the work support. This cutting die assembly is generally indicated by the numeral 80 and comprises a bridge plate 81 upon which is removably mounted a cylindrical die 82 arranged to snugly receive through the central portion thereof a circular punch 83. The punch 83 is securely retained in fixed position by an integral head portion 84 clamped between the plate 81 and the cutting die 82. A spring pressed plunger 85 is slidably positioned about the punch 83 so as to move vertically thereon and within the lower part of the die 82 during operation of the assembly. The plunger 85 has a narrowed upper portion 86 extending into the lower end of a compressed coiled spring 87, of proper predetermined strength, which bears against opposed faces of the cutting die 82 and the plunger 85 and tends to hold the plunger in its lowermost position at all times.

An adjustable ring 88 in threaded engagement with a slightly narrowed inner portion of the cutting die 82 is arranged to limit the inward movement of the plunger 85. A set screw 89 threaded into a side of the die 82 and bearing against a soft metal plug 90 in engagement with the threads of the ring 88 prevents subsequent movement of this ring. A passageway 91 extends vertically through the punch 83 and then laterally through the bridge plate 81 to a side thereof where it connects with the flexible air hose 48 previously described. A screw 92 having its inner end fitted into vertical slot 93 in the side of the punch 83 serves to limit the downward movement of the plunger 85 under the influence of the spring 87.

When this modified form of cutting die assembly 80 is to be used in the punching machine of Fig. 1, the plunger 34 and cam shoe 36 are omitted therefrom and the assembly 24 is replaced by the assembly 80. Apertured ends (not shown) of the bridge plate 81 are positioned upon the bolts 23 carried by the U-shaped cross head 18 and are vertically adjusted by the nuts 25 and 26 so as to be at a proper distance above the work support 27. When the hose 48 and the trip arms 69 and 73 have been properly connected to the assembly 80, the machine is ready for service.

During operation of this form of the invention downward movement of the cutting die assembly 80 causes the plunger 85 to engage the plastic stock. This engagement tends to hold all adjacent portions of the stock in position as the assembly continues to move downwardly and as the punch 83 first shears a plug therefrom. This plug is forced into the die 65 and is thereafter blown from the die by a blast of air emitted from the passageway 91 when the trip arm 73 engages the valve 70 in a manner similar to that previously described relative to the preceding embodiment.

During this initial operation the plunger 85, in engagement with the plastic stock on the work support 27 is forced inwardly into said cutting die thereby compressing the spring 87 until it comes into engagement with the ring 88. Since this ring forms a positive stop for the plunger further inward movement thereof cannot take place. Accordingly, a cavity or chamber for plastic material is formed beneath the plunger and within the cutting die 82 which is of an exact predetermined size or volume. Any excess plastic material which exists in the plastic stock at this time, due to variations in thickness thereof, will be forced laterally of the plunger and the cutting die during this action and thus the resultant plastic washer sheared or severed from the strip material will be of an exact predetermined volume.

As the assembly 80 starts to move upwardly from the work support 27, the washer 75 tends to adhere and remain within the cavity or chamber formed by the cutting die 82, punch 83 and plunger 85 and thus retards the action of the spring 87 tending to force the plunger 85 and the washer 87 downwardly. This delayed action is sufficient to allow the assembly 80, and the washer 55 therewith, to be elevated, a substantial distance above the strip 32 before the washer is finally forced to a position below and free from the lower end of the punch 83. When the washer is finally free of the punch 83, a blast of air and water from the nozzle 72 serves to blow the washer laterally from the machine in a manner similar to that previously described relative to the preceding embodiment.

Should it be desired to operate this cutting die assembly 80 without ejecting the washers 75 from the machine by a blast of air and water, a very strong spring might be used at 87 for causing the plunger 85 to move, without any substantial delay, to its lowermost position as the assembly moves upwardly. Such an action would cause the sheared washer 75 to remain in position within the strip 32 of plastic material as the assembly continues to move upwardly, and thus could be subsequently removed from the strip 32 by an operator as the strip progresses through the machine.

Figure 6:
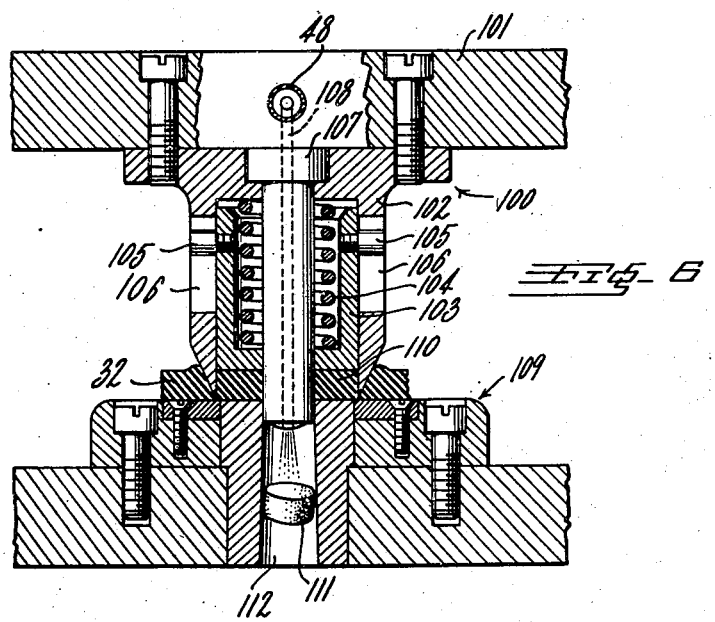
Fig. 6 is a vertical sectional view showing another modified form of punch and die combination which may also be employed as a part of the punching machine of Fig. 1.

A second modified form of cutting die assembly is shown by Fig. 6 with the parts thereof in an operative position. This assembly is generally indicated by the numeral 100 and comprises a bridge plate 101 supporting a cylindrical cutting die 102 within which is positioned a hollow cup-shaped plunger 103 arranged to slide vertically therewithin under the influence of a compressed coiled spring 104 bearing against its inner surface and an inner face of the cutting die 102. Stop screws 105 are positioned in the sides of the plunger and have their head portions arranged to travel within vertical slots 106 formed in the sides of the cutting die 102, so as to limit the downward movement of the plunger 103.

A circular punch 107 is centrally secured in position within the cutting die 102 and extends downwardly through the spring 104 and the plunger 103 and to a position substantially below the lower cutting edge of the die 102. A passageway 108 is formed within this punch and serves to emit air from the flexible hose 48 in a manner similar to that described in the preceding embodiments. A work support, somewhat similar to the work support 27 of Fig. 1 is indicated generally by the numeral 109. For the purpose of illustrating the invention a washer 110 is shown within the cutting die 102 and beneath the plunger 103 while a plug 111 punched from the plastic stock is shown within the tapered bore of a fixed die 112.

When it is desired to use the cutting die assembly 100 upon the punching machine of Fig. 1 it is merely necessary to position this assembly upon the bolts 23 in a manner similar to that described above relative to the embodiment in Fig. 5. After the parts have been properly positioned and adjusted, downward movement of the cutting die assembly 100 first causes engagement of the plunger 103 with the stock 32 on the support 109 and then subsequent downward movement thereof compresses the spring 104 and causes the punch 107 to engage the plastic stock and punch therefrom the plug 111. This plug is blown from the die 112 by a blast of air from passageway 108 in a manner similar to that described in the preceding embodiments. The plunger 103 and the work support 109 firmly engage the opposite surfaces of the plastic stock and tend to hold it in proper position while the cutting die 102 moves downwardly and shears the washer 110 of substantially predetermined volume from the plastic strip 32. Should the thickness of the plastic stock 32 be slightly greater than that desired for producing an exact predetermined volume in the washer 110 the pressure of the spring pressed plunger 103 thereon, as the assembly descends, would tend to squeeze or force the excess plastic material laterally of the cutting die 102 and thereby produce a washer of substantially correct predetermined volume.

As the assembly 100 moves upwardly following this shearing operation the washer 110 tends to remain in the cutting die 102 and about the punch 107 and this condition retards the spring 104 so that the washer 110 is not forced to a position below the lower end of the punch 107 until the assembly has been elevated to a position above the strip 32 and into a proper elevated position to be blown from the machine by a blast of air and water emitted from the nozzle 72, as described relative to the previous modifications.

While the die 30, plunger 34 and punch 45 of Fig. 1, and the corresponding elements in the modifications shown by Figs. 5 and 6, are indicated as being of circular shape in horizontal cross-section, any polygonal shapes desired might be employed in these elements. The shapes employed in said punches, plungers and dies would merely depend generally upon the particular final shapes desired in the plastic pieces or washers to be produced thereby.

From the foregoing decsription of the several preferred embodiments of the invention, it will be seen that successive similar pieces of plastic material of uniform or substantially uniform predetermined volume may be easily and quickly produced by this invention even though the physical properties of the plastic stock may vary considerably.

While we have described above several preferred embodiments of our invention, it will be readily apparent to those skilled in the art that various changes may be made therein without departing from the essence of the invention or the spirit and scope of the appended claims.

Having thus described our invention, what we claim and desire to protect by Letters Patent is:

1. A punching machine comprising a relatively fixed support, a plunger movable into a predetermined position relative to said support for forcing plastic material therebetween into a confined section of predetermined thickness, positive means for moving said plunger into said predetermined position, a punch having a portion thereof within said plunger and movable relative thereto for forming a perforation in said confined material, and a cutting die surrounding said plunger and movable relative thereto for severing excess material immediately adjacent said confined material.

2. A punching machine comprising a relatively fixed apertured work support, a plunger movable into a predetermined position relative to said support for compressing plastic material therebetween into a confined section of predetermined thickness, positive means for moving said plunger into said predetermined position, and punch and die means associated with said support and plunger and movable realtive thereto and into engagement with said support for perforating said confined material and severing from said confined material excess material adjacent thereto.

3. A punching machine comprising a relatively fixed work support, a plunger movable into a predetermined operative position relative to said support for forming and confining a portion of a strip of plastic material therebetween so as to be of an exact predetermined thickness, positive means for moving said plunger into its operative position, and punch and die means operatively associated with said support and plunger and movable into a position adjacent said support for perforating and severing from said strip said confined portion as a plastic washer of predetermined volume.

4. A punching machine comprising a main frame, a work support fixed relative thereto, a plunger adapted to be moved into a predetermined position relative to said work support for compressing and confining plastic material therebetween into a confined portion of predetermined thickness, a cutting die closely surrounding said plunger and slidable relative thereto and into a position in engagement with said support for severing from said confined material excess material adjacent thereto, and means carried by said frame for positively moving said plunger to said predetermined position, and additional means for moving said cutting die relative thereto.

5. A punching machine comprising a frame, a work support fixed relative thereto, a plunger slidably mounted for movement to a predetermined position relative to said support for compressing and confining a portion of a strip of plastic material therebetween so as to be of an exact predetermined thickness, a cutting die closely surrounding the lower end of said plunger and movable relative thereto into a position adjacent said work support for severing said confined portion from said strip, and power means for positively moving said plunger into its operative position and for actuating said cutting die.

6. A punching machine comprising a frame, an apertured work support fixed relative thereto, a plunger slidably mounted for movement to a predetermined position relative to said work support for compressing and confining a portion of a strip of plastic material therebetween so as to be of an exact predetermined thickness, a cutting die closely surrounding the lower end of said plunger and movable relative thereto, a punch positioned within an aperture in said plunger and adapted to be moved relative thereto and relative to said work support so as to enter the aperture in said support for perforating said confined portion of said strip, said cutting die being movable to a position adjacent said work support for severing excess material from said confined material, means for positively moving said plunger into its predetermined operative position, and means for actuating said punch and cutting die simultaneously.

7. A punching machine comprising a main frame, an apertured work support fixed relative thereto, an apertured plunger mounted for movement to a predetermined position relative to said support for confining a portion of a strip of plastic material therebetween, a punch slidably positioned in said apertured plunger, a cutting die surrounding at least a portion of said plunger and operatively connected to said punch for movement therewith into an operative position adjacent said work support with said punch extending into the aperture in said support, and power means for actuating said plunger, cutting die, and said punch, whereby said die and said punch are adapted to perforate and sever from said strip of plastic material said confined portion as a washer of predetermined volume.

8. A punching machine comprising a main supporting frame, a work support fixed relative thereto, a cutting die slidably mounted in said frame for movement relative to and into engagement with said work support, a punch operatively connected to said cutting die for movement therewith, a plunger having at least an end portion thereof located within said cutting die and surrounding a portion of said punch, said plunger being slidable relative to said punch and die for movement to a predetermined position adjacent said work support so as to engage a portion of a strip of plastic material positioned thereon, and means for jointly actuating said punch, cutting die and plunger for perforating and severing from said plastic material said engaged portion as a washer of predetermined volume.

9. A punching machine comprising a main frame, an apertured work support fixed relative thereto, a cutting die slidably mounted upon said frame for movement relative to and into engagement with said work support, a punch operatively connected to said cutting die and arranged to be moved thereby so as to enter the aperture in said support, a plunger having at least the lower end thereof located within said cutting die and surrounding a portion of said punch, said plunger being slidable relative to said punch and die for movement to a predetermined position relative to said work support so as to force a portion of a strip of plastic stock on said support into a confined section of predetermined thickness, means for positively forcing said plunger into said predetermined position, power means operatively associated with said punch, plunger and cutting die for actuating same so as to perforate and sever from said plastic strip said confined portion as a washer of predetermined volume, and pneumatic means responsive to movement of said cutting die for ejecting said washer from said machine.

10. A punching machine comprising a main frame, a work support fixed relative thereto, a cutting die assembly mounted in said main frame for movement relative to said support and having a cutting die movable into operative engagement with said support, a spring pressed plunger movably mounted in said cutting die for engagement with a portion of a strip of plastic material upon said work support, means associated with said cutting die for positively limiting the inward movement of said plunger so as to cause the plunger to assume a predetermined operative position relative to said work support as the cutting die engages the work support, and power means for moving said plunger and said cutting die into said operative positions.

11. The method of forming a washer of predetermined volume from a strip of plastic material comprising the steps of compressing and rigidly maintaining a portion of said strip in a confined position between opposed surfaces so as to produce and maintain a predetermined thickness therein, punching an aperture through a portion of said strip intermediate said confined portion, and then severing said confined portion from adjacent unconfined material of the strips while the punching means remains in said aperture and the opposed surfaces remain in operative position, whereby the stresses in the confined material are resisted and distortion of same is substantially prevented by said punching means and said opposed surfaces during severing of the confined portion from said strip of plastic material.

12. The method of forming a piece of plastic material of predetermined volume from a strip of plastic stock comprising the steps of compressing and rigidly maintaining a portion of said strip in a confined position between opposed surfaces for producing and maintaining an exact predetermined thickness therein, perforating an intermediate portion of said strips within said confined portion while said opposed surfaces remain in operative position and thereby prevent any substantial distortion of the material, severing the confined portion from the excess material surrounding said confined portion while said opposed surfaces remain in operative position, and removing the severed portion from the plane of said plastic strip as a washer of predetermined volume.

13. A punching machine comprising a main frame, a work support fixed relative thereto, a cutting die assembly mounted in said main frame for movement relative to said work support and having a cutting die mounted thereon for movement into operative engagement with said work support, a plunger having its lower end apertured and slidably mounted in said cutting die, a punch slidably positioned in the aperture of said plunger and operatively connected to said cutting die for movement therewith, a fixed die in said work support in alignment with said punch, means for moving said plunger to a predetermined position relative to said work support for confining a portion of a strip of plastic material positioned on said work support, additional means for moving said punch and cutting die simultaneously into operative positions with the punch extending into said fixed die and the cutting die in engagement with the upper surface of said work support, whereby said punch is arranged to sever a plug for said plastic material intermediate said confined material by forcing the plug into said fixed die and said cutting die is arranged to subsequently sever the confined material from the unconfined material of the plastic strip to thereby form a plastic washer of exact predetermined size, and automatically operable means for blowing said plug and washer from the machine after same have been freed from said strip.

ALFRED N. IKNAYAN.
RALPH G. NULL.